March 12, 1968 J. R. WINEGARD 3,373,361

ANTENNA COUPLER SYSTEM PROVIDING ISOLATION BETWEEN ANTENNAS

Filed April 26, 1965

Inventor
John R. Winegard
By Frost, Burmeister & Kulie
Attorneys

United States Patent Office 3,373,361
Patented Mar. 12, 1968

3,373,361
ANTENNA COUPLER SYSTEM PROVIDING ISOLATION BETWEEN ANTENNAS

John R. Winegard, Burlington, Iowa, assignor to The Winegard Company, Burlington, Iowa, a corporation of Iowa Filed Apr. 26, 1965, Ser. No. 450,931
3 Claims. (Cl. 325—367)

This invention relates to an improved coupler system for connecting two or more antennas or other television signal sources to a single television receiver or single television receiving system, in which there is a high degree of isolation between the antennas and at the same time relatively low loss in feeding the receiver from each of the antennas.

It is frequently necessary to provide more than one antenna for a single television receiver. This may happen, for example, when the stations to be received are in different directions from the receiving location and it is desirable to have antennas pointed in each of several directions. This may also happen when the requirements of gain dictate the use of stacked antennas or of antennas cut to specific channels. The need may also arise where the frequencies of the channels to be received are so disparate that separate antennas are desirable. In all of these instances it is necessary to provide some acceptable means to connect the receiver to operate with each antenna, while at the same time avoiding interaction between the separate antennas. While in some instances such connections can be made by the use of switches and duplicate transmission lines to each such switch, such an arrangement is combersome, requires manipulation, and is subject to difficulty when the receiver is tuned to one channel and the switch is set for a different channel. Also, in some instances, resonant stacking connections may be used. In this case, however, the action takes place effectively only over a narrow frequency range.

The present application is based on the discovery that, with a coupler system having a high degree of isolation between the antennas and with proper matching of the various impedances, it is possible to energize a single receiver from a plurality of antennas in a manner that is far superior to that available with even a slight mismatch in the feed path or slight coupling between the antennas.

In accordance with the present invention, a television receiving system is provided in which two antennas are connected to a common receiver through the medium of a coupler. The coupler serves to feed signals from each antenna to the common receiver while imposing only slight loss in the signal path from each antenna to the receiver. At the same time, however, the coupler imposes a high impedance and mismatch from each antenna to the other antenna so that the operating characteristics of any one of the antennas are not prejudiced by the presence of the other antenna. The present invention contemplates the use of a coupler having an impedance transformation device and a pair of balanced transformers each having an impedance connected across the terminals remote from the receiver. Additionally, the impedances are exactly matched for the antennas and for the receiver. With this particular arrangement, the isolation achieved from each antenna to the other is particularly good and unusually effective operation is achieved.

It is therefore a general object of the present invention to provide an improved coupler system for connecting two or more antennas or other television signal sources to a single television receiving systems or receiver with a high degree of effectiveness.

Another object of the present invention is to provide an improved coupler system of the foregoing type that utilizes permanently connected static circuit elements that require no switching, are inexpensive and reliable, and yet provide performance substantially as favorable as would be possible if the antennas were selectively connected to the receiver.

Still another object of the present invention is to provide an improved coupler system of the foregoing type wherein a relatively low loss signal path is provided between each antenna and the receiver while a high impedance path is presented between the respective antennas and wherein the impedances of the antennas and the receiver are effectively matched.

Yet another object of the present invention is to provide an improved coupler system of the foregoing type in embodying features of construction, combination and arrangement rendering it particularly suitable for installain practical television receiving systems, and otherwise suitable for commercial utilization.

The novel features which are believed to be characteristic of the invention are set forth with particularity in the appended claims. The invention itself, however, both as to its organization and as to further objects and advantages thereof will best be understood from the following description, taken in conjunction with the accompanying drawings, in which:

Figures 1, 2, 3, 4, 5:
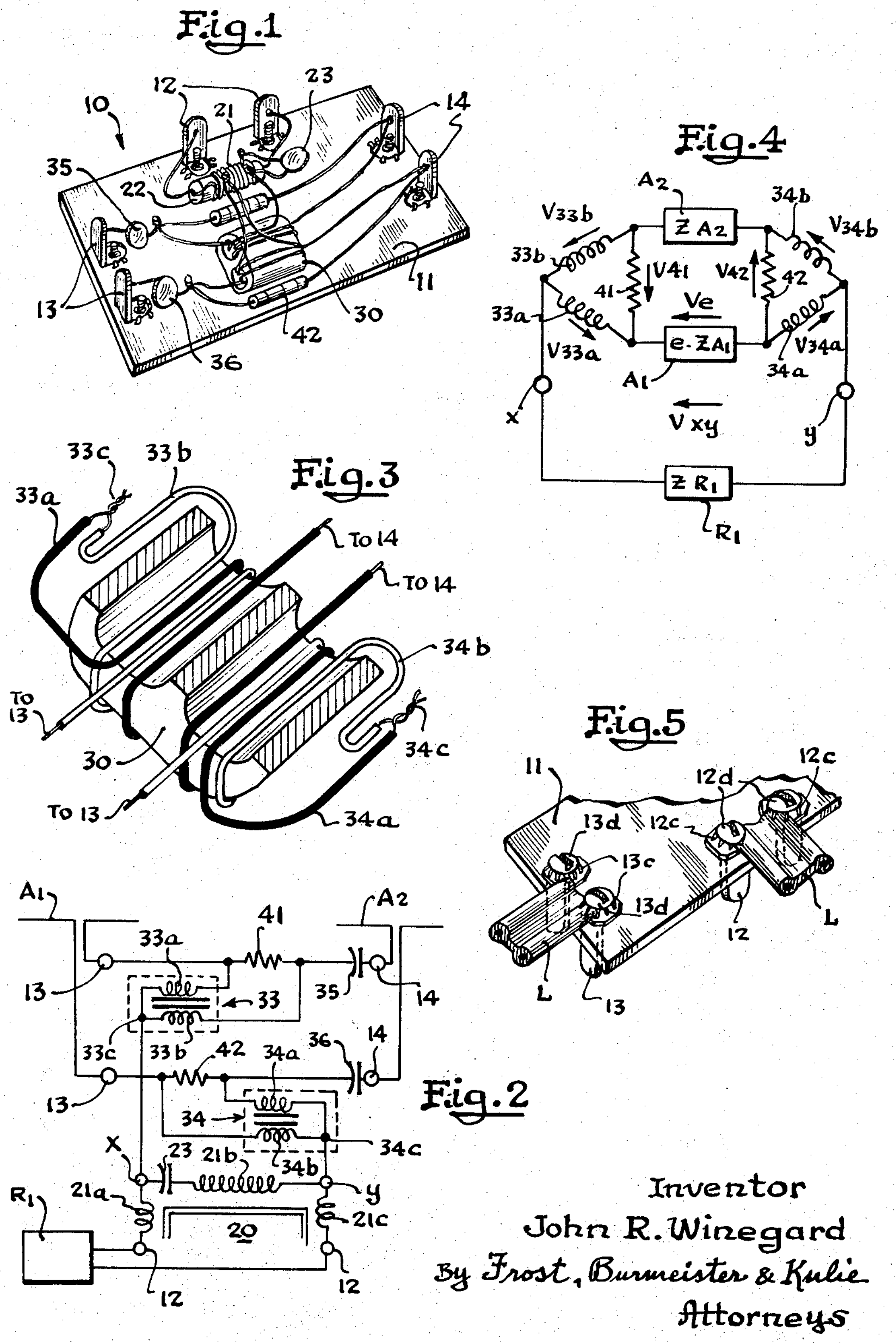
FIGURE 1 is a perspective view of a portion of a coupler device suitable for use in accordance with the present invention.
FIGURE 2 is a schematic diagram of the coupler system wherein a pair of antennas are connected to a single receiver.
FIGURE 3 is a perspective view in partial cross-section of a portion of the ferrite core showing the associated transformer winding detail thereon.
FIGURE 4 is a simplified explanatory diagram of the circuit of FIGURE 2.
FIGURE 5 is a fragmentary view in perspective of the underside of the base of the coupler of FIGURE 1.

Referring now to FIGURE 1, a coupler device 10 is shown which is suitable for use with the present invention and, in its preferred form, consists of a generally rectangular shaped base 11 of Bakelite material or the like. The base 11 is preferably about 2¼" by 3½" in size. A suitable cover (not shown) is provided to protect the assembled unit from dust, ice, snow and the like.

The base 11 serves as a mounting board for the various circuit components and connecting terminals. One such terminal pair 12 serves for connecting to the receiver R1 (FIGURE 2) while two other such terminal pairs 13 and 14 serve for connecting to the associated television receiving antennas A1 and A2, respectively, as shown. The terminals 12, 13 and 14 include upstanding soldering lugs on the inside of the base for the interconnection of the various circuit components. Each of the screw terminals include an associated machine screw and a serrated washer. As shown in FIGURE 5, the terminals 12 include the machine screw **12*c* and the washer 12*d* and the terminals 13 include the screw 13*c* and the washer 13*d*. (Terminals 14 and the associated screw and washer are not shown.) To connect the twin-lead transmission line L from the respective antennas and from the receiver to the appropriate terminals of the coupler 10**, an end portion of the line L is inserted under the serrated washer, such as 12*d* or 13*d*, and the machine screw, such as 12*c* or 13*c*, and tightened sufficiently to cause the washer to pierce the insulation and make contact with the internal conductors positioned along the longitudinal edges of the line L.

The coupler 10 includes an impedance transformation circuit 20 interconnected between the terminals 12 and a pair of reference terminals X and Y (FIGURES 2 and 4). The circuit 20 includes a coil 21 wound on a ferrite core 22. The coil 21 includes twelve turns on the core 22 with a pair of intermediate tap points serving as the aforementioned reference terminals X and Y as well as forming three separate windings 21*a*, 21*b* and 21*c*, respectively. A blocking capacitor 23 is electrically interconnected between the winding 21*a* and the winding 21*b*. The windings 21*a* and 21*c* include two complete turns on the ferrite core 22 while the winding 21*b* includes eight turns, or twice that of the windings 21*a* and 21*c* combined. With the connections as thus described and shown in FIGURES 1 and 2, the circuit 20 is operative to effect a 2:1 change in the impedance of the receiver R1 connected to the terminals 12 which matches the impedances of the antennas A1 and A2 connected to the terminals 13 and 14, respectively, as will be hereinafter described.

The coupler 10 further includes a ferrite core 30 which serves as a coil form upon which a pair of balanced transformers 33 and 34 are wound. The core 30 is of an elongated, generally rectangular shape and composed of a suitable ferrite material. In the form shown, the dimensions of the core 30 are approximately ½" wide by ½" long by ¼" thick. The core 30 further includes twin non-intersecting cylindrical bores therethrough of approximately ⅛" in diameter in the longitudinal axial direction so as to form two separate and distinct compartments for winding the two associated but operationally independent transformers 33 and 34 (best seen in FIGRE 3). Each of the transformers 33 and 34 wound on the core 30 encompasses a separate volume of the ferrite material such that the flux produced by one of the transformers will not materially interfere with the flux produced by the other of the transformers.

Each of the transformers 33 and 34 includes a pair of substantially identical windings. The transformer 33 has windings 33*a* and 33*b* while the transformer 34 has windings 34*a* and 34*b*. A center tap 33*c* of the transformer 33 is connected to the reference terminal X and a center tap 34*c* of the transformer 34 is connected to the reference terminal Y. The transformer 33 is connected between one of the screw terminals 13 and one of the screw terminals 14 through a blocking capacitor 35 while the transformer 34 is connected between the other of the screw terminals 13 and the other of the screw terminals 14 through a blocking capacitor 36. A resistor 41 is connected in parallel with the transformer 33 and a resistor 42 is connected in parallel with the transformer 34.

In fabrication, the transformers 33 and 34 are wound on the ferrite core 30 from 150 ohm small size twin-lead conductor. The fabrication details for the transformer 33 and 34 can be more clearly seen in FIGURE 3. The winding 33*a*, shown as a black wire, is wound from the left to the right (clockwise) on the core 30 one and one-half turns while the winding 33*b*, shown as a white wire, is wound from the right to the left one and one-half turns (counterclockwise) on the core 30. Similarly, the winding 34*a*, a black wire, is wound clockwise on the core 30 while the winding 34*b*, a white wire, is wound counterclockwise.

The action of the coupler 10 is feeding the receiver R1 from each of the associated antennas A1 and A2 can best be understood by reference to FIGURE 4. The antennas A1 and A2 are assumed to have substantially equal characteristic impedances of substantially the same value as that of the receiver R1. That is, of approximately 300 ohms. It will be noted that current flows from the antenna A1 through the windings 33*a* and 34*a* of the transformers 33 and 34 and from the antenna A2 through the windings 33*b* and 34*b* of the transformers. Moreover, these windings are poled so that the resultant current flow from the antenna A1 produces a magnetomotive force in the core 30 which is equal and opposite the magnetomotive force caused therein by the current flow from the antenna A2. The consequence is that there is no net M.M.F. effective in the core 30 and therefore no induced voltage across any transformer winding. In theory, therefore, the antennas A1 and A2 together act as if connected directly across the terminals X and Y.

In actual fact, however, the loads and the transformer windings are never prefectly balanced. This is because there is always some leakage inductance present. There are also stray capacitances and other resistances that may affect operation. The losses and mismatch extending from each antenna load to the reference terminals X and Y are nevertheless small and a high degree of coupling efficiency is realized.

Since the antennas A1 and A2 are in effect in parallel across the terminals X and Y, the net load impedance is about one-half that of a single antenna. With a nominal 300 ohm impedance for the respective antennas, this gives about 150 ohms as a load impedance between the reference terminals X and Y, which is the same as presented to the terminals X and Y when a nominal 300 ohm receiver is connected to the terminals 12 and transformed by the impedance circuit 20.

FIGURE 4 shows diagrammatically the various impedances and circuit connects of significance in understanding the practical operation of the coupler system. Number symbols on this diagram correspond to the apparatus shown in FIGURES 1 and 2, but it should be understood that in some instances the actual apparatus is connected only indirectly so that the impedance values of FIGURE 4 do not necessarily mean the same impedance values as are measured across the terminals of the apparatus. For purposes of practical explanation, a signal voltage *e* is assumed to be generated in the Antenna A1. This voltage will, of course, appear as a generated voltage "behind" an internal impedance $Z_{A1}$.

One circuit through which curent flows as a consequence of the signal voltage *e* may be traced through the winding 33*a* to the terminal X, from the terminal X to the terminal Y through the impedance $Z_{R1}$, and through the winding 34*a*. The actual voltage appearing across the windings 33*a* and 34*a* will be less than the value of the voltage *e* in an amount determined by the relative impedances in this series circuit. The direction of the voltages across the windings 33*a* and 34*a* will be in opposition to the voltage *e*, which means that, with the voltage *e* as represented by the arrow $V_e$, the voltages across the windings 33*a* and 34*a* are in the direction of the arrows $V_{33a}$ and $V_{34a}$, as shown.

Another circuit through which current flows may take place as a consequence of the signal voltage *e* may be traced through the resistance 41, through the antenna load $Z_{A2}$, and through the resistance 42. The actual voltage appearing across the antenna load $Z_{A2}$ must equal the voltage at the terminals of the antenna load $Z_{A1}$, less the voltage drops of the resistances 41 and 42, provided these voltage drops are in the direction of the arrows $V_{41}$ and $V_{42}$. And if these voltages are equal to the terminal voltage of the antenna load $Z_{A1}$ due to the voltage *e*, then no voltage will appear across the antenna load $Z_{A2}$ and effective isolation is achieved.

The windings 33*a* and 33*b* are so poled as to give additive voltages when the loop defined by the winding 33*b*, the winding 33*a* and the resistance 41 is traced. Consequently, the voltage drop across the resistance 42 has the direction shown by the arrow $V_{42}$ and is equal to the sum of $V_{34b}$ and $V_{34a}$. The voltage across the antenna load $Z_{A2}$ is thus equal to the voltage across the terminals of the antenna load $Z_{A1}$, less the total voltage drop in all four transformer windings. By proper choice of the impedance of these windings in relation to the total impedance across the reference terminals X and Y, it is thus possible to achieve a high degree of isolation between the respective antennas A1 and A2.

The system of the present invention provides performance that is very much better than has heretofore been possible. It has been found that with the specific system of the present invention the degree of impedance matching at the receiver terminals is critical. This is contrary to the usual situation in communications circuits. Ordinarily, performance varies only slightly from peak performance as the degree of mismatch varies from the matched condition. With the apparatus of the present invention, however, a relatively small mismatch results in a very great degradation of performance. In the case of stacked antennas, for example, the apparatus of the present invention provides a vastly better performance than the performance attained with some mismatch at the receiver terminals—and the performance without the transformer 33 is sufficiently degraded to make the use of the coupler not very much preferable in performance to the use of resonant stacking bars.

While only one embodiment of the present invention is shown and described herein, it will be understood that certain modifications may be effected without materially departing from the true scope of the invention. It will be understood that the appended claims are intended to cover all modifications and alternative constructions within their true spirit and scope.

What is claimed is:

1. In combination:

a television receiving apparatus having a predetermined input impedance and operable over a band including a plurality of television channels;

a first television signal source having said predetermined impedance and being effective to supply signals in at least one of said channels;

a second television signal source having said predetermined impedance and being effective to supply signals in at least one other such channel;

a coupler device having first and second pairs of input terminals, a pair of output terminals and a pair of reference terminals;

means connecting the pair of output terminals to the television receiving apparatus;

means connecting the first pair of input terminals to the first television signal source;

means connecting the second pair of input terminals to the second television signal source; and circuit means in the coupler defining circuit connections from one terminal of the output terminal pair to one terminal of each of said first and second input terminals pairs and from the other terminal of the output terminal pair to the other terminal of each of said first and second terminal pairs, said circuit means including impedance transformation means having substantially a 2:1 impedance ratio interposed between the pair of output terminals and the pair of reference terminals, at least one transformer having a core and a pair of windings encircling the same, one winding being interposed between one of the reference terminals and one of the terminals of the first input terminal pair and the other winding being interposed between said one terminal of the pair of reference terminals and one terminal of the second input terminal pair, the windings being so constructed and poled as to produce substantially equal and opposing magnetomotive forces in the core upon like current flow from the first and second input terminal pairs to the output terminal pair.

2. In combination:

a television receiving apparatus having a predetermined input impedance and operable over a band including a plurality of television channels;

a first television signal source having said predetermined impedance and being effective to supply signals in at least one of said channels;

a second television signal source having said predetermined impedance and being effective to supply signals in at least one other such channel;

a coupler device having first and second pairs of input terminals, a pair of output terminals and a pair of reference terminals;

means connecting the pair of output terminals to the television receiving apparatus;

means connecting the first pair of input terminals to the first television signal source;

means connecting the second pair of input terminals to the second television signal source; and circuit means in said coupler defining circuit connections from one terminal of the output terminal pair to one terminal of each of said first and second input terminal pairs and from the other terminal of the output terminal pair to the other terminal of each of said first and second input terminal pairs, said circuit means including impedance transformation means having substantially a 2:1 impedance ratio interposed between the output terminal pair and the pair of reference terminals, a pair of transformers each having a core and a pair of windings, one winding of each transformer being interposed between one terminal of said first input terminal pair and one terminal of said reference terminal pair, respectively, and the other winding of each transformer being interposed between one terminal of said second input terminal pair and one terminal of said reference terminal pair, respectively, said windings being so constructed and poled as to produce a substantially equal and opposing magnetomotive forces in each core upon like current flow from said first and second input terminals to said output terminals.

3. In combination:

a television receiving apparatus having a predetermined input impedance and operable over a band including a plurality of television channels;

a first television signal source having said predetermined impedance and being effective to supply signals in at least one of said channels;

a second television signal source having said predetermined impedance and being effective to supply signals in at least one other such channel;

a coupler device having first and second pairs of input termnials, a pair of output terminals and a pair of reference terminals;

means connecting the pair of output terminals to the television receiving apparatus;

means connecting the first pair of input terminals to the first television signal source;

means connecting the second pair of input terminals to the second television signal source;

circuit means in said coupler defining circuit connections from one terminal of the output terminal pair to one terminal of each of said first and second input terminal pairs and from the other terminal of the output terminal pair to the other terminal of each of said first and second input terminal pairs, said circuit means including impedance transformation means interposed between said output terminal pair and said pair of reference terminals, a pair of transformers each having a core and a pair of windings, one winding of each transformer being interposed between one terminal of said first input terminal pair and one terminal of said reference terminal pair, respectively, and the other winding of each transformer being interposed between one terminal of said second input terminal pair and one terminal of said reference terminal pair, respectively, said windings being so constructed and poled so as to produce a substantially equal and opposing magnetomotive force in each of the cores upon like current flow from said first and second input terminals to said output terminals, and impedance means connected across the windings of each transformer at the ends remote from said reference terminals, such impedance being of a value to isolate the first pair of input terminals from the second pair of input terminals.

References Cited

UNITED STATES PATENTS 3,226,724 12/1965 Brueckmann -------- 343—853

WILLIAM C. COOPER, *Primary Examiner.*

KATHLEEN H. CLAFFY, *Examiner.*

R. S. BELL, *Assistant Examiner.*